(12) United States Patent
Inoue et al.

(10) Patent No.: US 10,286,269 B2
(45) Date of Patent: *May 14, 2019

(54) GRIP FOR SPORTING GOODS AND GOLF CLUB

(71) Applicant: SUMITOMO RUBBER INDUSTRIES, LTD., Kobe-shi, Hyogo (JP)

(72) Inventors: Hidetaka Inoue, Kobe (JP); Sho Goji, Kobe (JP); Kuniyasu Horiuchi, Kobe (JP); Kazuyoshi Shiga, Kobe (JP); Chiemi Mikura, Kobe (JP); Hitoshi Oyama, Kobe (JP); Toshiyuki Tarao, Kobe (JP); Hiroshi Hasegawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,971

(22) Filed: Dec. 23, 2016

(65) Prior Publication Data
US 2017/0182386 A1    Jun. 29, 2017

(30) Foreign Application Priority Data
Dec. 25, 2015    (JP) ................. 2015-253776

(51) Int. Cl.
*A63B 53/14*    (2015.01)
*C08L 7/00*    (2006.01)
(Continued)

(52) U.S. Cl.
CPC ........... *A63B 53/14* (2013.01); *C08K 3/04* (2013.01); *C08K 3/06* (2013.01); *C08K 3/22* (2013.01);
(Continued)

(58) Field of Classification Search
None
See application file for complete search history.

(56) References Cited

U.S. PATENT DOCUMENTS 4,819,939 A * 4/1989 Kobayashi ............ A63B 60/14
473/299
5,545,094 A * 8/1996 Hsu ........................ A63B 53/10
473/317
(Continued)

FOREIGN PATENT DOCUMENTS

JP    7-292169 A    11/1995
JP    9-165429 A    6/1997
(Continued)

OTHER PUBLICATIONS

Office Action issued in Japanese Patent Application No. 2015-253776 dated Aug. 2, 2016.

*Primary Examiner* — Peter A Salamon
(74) *Attorney, Agent, or Firm* — Birch, Stewart, Kolasch & Birch LLP

(57) ABSTRACT

An object of the present invention is to provide a grip for sporting goods containing an acrylonitrile-butadiene based rubber as a base rubber and having an excellent grip performance and sustainability of grip performance under a wet condition. The present invention provides a grip for sporting goods comprising an outermost surface layer formed from a surface layer rubber composition, wherein the surface layer rubber composition contains (A) a base rubber and (B) a resin having a softening point in a range from 5° C. to 120° C., (A) the base rubber contains an acrylonitrile-butadiene based rubber, and (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin.

24 Claims, 2 Drawing Sheets

(51) Int. Cl.
*C08L 9/02* (2006.01)
*C08K 3/04* (2006.01)
*C08K 3/06* (2006.01)
*C08K 3/22* (2006.01)
*C08K 5/09* (2006.01)
*C08K 5/14* (2006.01)
*C08K 5/39* (2006.01)
*C08K 5/40* (2006.01)
*C08L 13/00* (2006.01)
*C08L 15/00* (2006.01)
*C08L 23/08* (2006.01)
*C08L 45/02* (2006.01)
*C08L 93/04* (2006.01)

(52) U.S. Cl.
CPC .............. *C08K 5/09* (2013.01); *C08K 5/14* (2013.01); *C08K 5/39* (2013.01); *C08K 5/40* (2013.01); *C08L 7/00* (2013.01); *C08L 9/02* (2013.01); *C08L 13/00* (2013.01); *C08L 15/005* (2013.01); *C08L 23/0853* (2013.01); *C08L 45/02* (2013.01); *C08L 93/04* (2013.01)

(56) References Cited

U.S. PATENT DOCUMENTS

| | | | | |
|---|---|---|---|---|
| 5,634,859 | A * | 6/1997 | Nesbitt | A63B 53/14 473/301 |
| 9,630,077 | B2 * | 4/2017 | Mikura | A63B 60/08 |
| 2003/0207241 | A1 * | 11/2003 | Manual | A63B 53/14 434/252 |
| 2004/0031127 | A1 * | 2/2004 | Chen | A63B 49/08 16/436 |
| 2005/0020374 | A1 * | 1/2005 | Wang | A63B 53/14 473/300 |
| 2005/0148727 | A1 * | 7/2005 | Ajbani | C08L 53/005 525/63 |
| 2006/0128894 | A1 * | 6/2006 | Nasreddine | C08K 5/14 525/178 |
| 2011/0165958 | A1 * | 7/2011 | Hachiro | A63B 53/14 473/300 |
| 2012/0129624 | A1 * | 5/2012 | Ito | A63B 53/14 473/303 |
| 2013/0079173 | A1 * | 3/2013 | Wu | A63B 53/14 473/300 |
| 2015/0322245 | A1 * | 11/2015 | Mikura | C08K 3/011 523/149 |
| 2016/0121183 | A1 * | 5/2016 | Goji | A63B 60/08 473/300 |
| 2016/0136491 | A1 * | 5/2016 | Inoue | A63B 53/14 473/300 |
| 2016/0136492 | A1 * | 5/2016 | Mikura | A63B 60/08 473/300 |

FOREIGN PATENT DOCUMENTS

| | | |
|---|---|---|
| JP | 11-347166 A | 12/1999 |
| JP | 2003-38694 A | 2/2003 |
| JP | 2004-10719 A | 1/2004 |
| JP | 3701220 B2 | 9/2005 |
| JP | 2006-169523 A | 6/2006 |
| JP | 2009-112500 A | 5/2009 |
| JP | 2010-70699 A | 4/2010 |
| JP | 2012-82401 A | 4/2012 |
| JP | 2015-213677 A | 12/2015 |
| JP | 2015-231510 A | 12/2015 |

* cited by examiner

GRIP FOR SPORTING GOODS AND GOLF CLUB

FIELD OF THE INVENTION

The present invention relates to a grip for sporting goods.

DESCRIPTION OF THE RELATED ART

As a grip (anti-slip member) provided on sporting goods, a grip made of a rubber is frequently utilized. As such a rubber grip, for example, JP 3701220 B discloses a golf club grip formed by crosslinking a rubber composition, wherein the rubber composition contains an acrylonitrile-butadiene rubber having a glass transition point of −40° C. or more and −13° C. or less in a ratio of 45 mass % or more with respect to a total amount of a base polymer; a peak temperature of a loss coefficient curve of the grip is −29° C. or more and 0° C. or less, when measured with a viscoelastic spectrometer under conditions of initial strain of 10%, amplitude of ±2%, frequency of 10 Hz, start temperature of −100° C., end temperature of 100° C., temperature rising speed of 3° C./min, and a deformation mode of tension (refer to claim 4 of JP 3701220 B).

In addition, a golf club grip using an acrylonitrile-butadiene based rubber as a base rubber and having an improved tensile strength or abrasion resistance has also been proposed. For example, US 2015/0322245 A1 discloses a golf club grip formed from a rubber composition comprising a base rubber and a crosslinking agent, wherein the base rubber comprises a hydrogenated acrylonitrile-butadiene rubber and/or a carboxyl-modified acrylonitrile-butadiene rubber (refer to claim 1, paragraphs 0004 and 0005 of US 2015/0322245 A1).

SUMMARY OF THE INVENTION

It has been proposed to use the acrylonitrile-butadiene based rubber as the base rubber constituting the grip. However, if the acrylonitrile-butadiene based rubber is used in the base rubber, the grip performance under a wet condition tends to be lowered compared with the case where the natural rubber is used in the base rubber. The present invention has been made in view of the abovementioned circumstances, and an object of the present invention is to provide a grip for sporting goods containing an acrylonitrile-butadiene based rubber as a base rubber and having an excellent grip performance and sustainability of grip performance under a wet condition.

The present invention that has solved the above problems provides a grip for sporting goods comprising an outermost surface layer formed from a surface layer rubber composition, wherein the surface layer rubber composition contains (A) a base rubber and (B) a resin having a softening point in a range from 5° C. to 120° C., (A) the base rubber contains an acrylonitrile-butadiene based rubber, and (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin. If the surface layer rubber composition for forming the outermost surface layer contains (B) the resin, the grip performance and the sustainability of grip performance under a wet condition improve.

The present invention also provides a golf club comprising a shaft, a head provided on one end of the shaft, and a grip provided on another end of the shaft, wherein the grip is the above-described grip for sporting goods.

According to the present invention, a grip for sporting goods excellent in the grip performance and sustainability of grip performance under a wet condition is obtained.

DESCRIPTION OF THE PREFERRED EMBODIMENT

Figure 1:
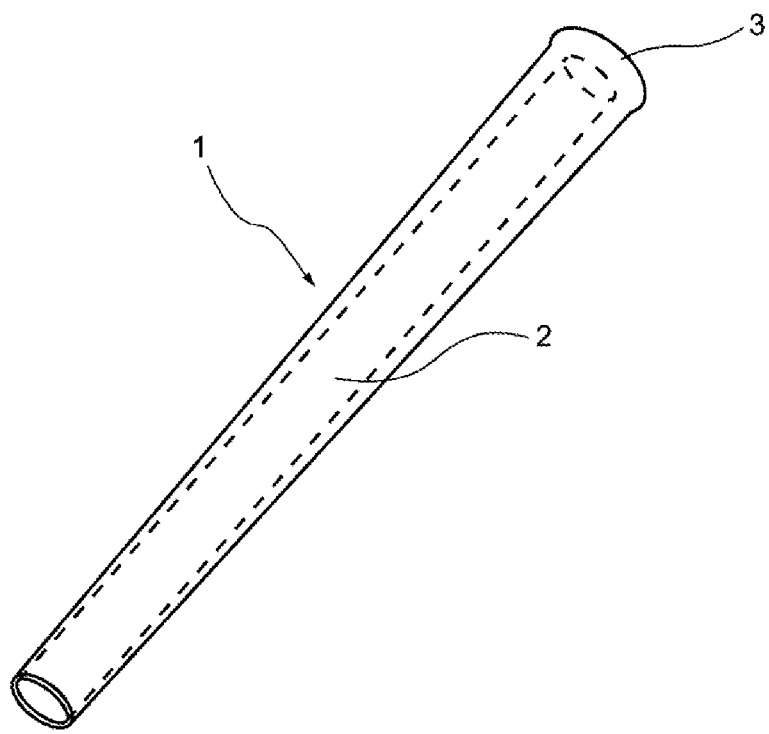
FIG. 1 is a perspective view showing one example of a golf club grip.

The present invention provides a grip for sporting goods comprising an outermost surface layer formed from a surface layer rubber composition, wherein the surface layer rubber composition contains (A) a base rubber and (B) a resin having a softening point in a range from 5° C. to 120° C., (A) the base rubber contains an acrylonitrile-butadiene based rubber, and (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin. If the acrylonitrile-butadiene based rubber is used as (A) the base rubber of the surface layer rubber composition, the tensile strength or abrasion resistance of the outermost surface layer improves. In addition, if (B) the resin is contained in the surface layer rubber composition, the grip performance and the sustainability of grip performance under a wet condition improve.

[Outermost Surface Layer]

The outermost surface layer of the grip for sporting goods is formed from the above surface layer rubber composition. Herein, the outermost surface layer is an outermost layer of the grip, i.e. a layer touched by the user when using the grip. It is not particularly limited as long as at least one part of the layer of the grip for sporting goods touched by the user when using the grip is formed from the above surface layer rubber composition. Further, the whole outermost surface layer of the grip for sporting goods may be formed from the above surface layer rubber composition. It is noted that, when the grip for sporting goods comprises a cylindrical portion which will be described later, the whole outermost surface layer of the cylindrical portion is preferably formed from the above surface layer rubber composition.

The surface layer rubber composition contains (A) a base rubber containing an acrylonitrile-butadiene based rubber, and (B) a resin having a softening point in a range from 5° C. to 120° C.

(A) Base Rubber

Examples of the acrylonitrile-butadiene based rubber include an acrylonitrile-butadiene rubber (NBR), a carboxyl-modified acrylonitrile-butadiene rubber (XNBR), an hydrogenated acrylonitrile-butadiene rubber (HNBR), and a carboxyl-modified hydrogenated acrylonitrile-butadiene rubber (HXNBR). XNBR is a copolymer of a monomer having a carboxyl group, acrylonitrile and butadiene. HNBR is a hydrogenated product of the acrylonitrile-butadiene rubber. XHNBR is a hydrogenated copolymer of a monomer having a carboxyl group, acrylonitrile and butadiene.

The surface layer rubber composition may further contain a rubber other than the acrylonitrile-butadiene based rubber as (A) the base rubber. The amount of the acrylonitrile-butadiene based rubber in (A) the base rubber is preferably 50 mass % or more, more preferably 60 mass % or more, and even more preferably 70 mass % or more. In addition, it is also preferred that the surface layer rubber composition contains only the acrylonitrile-butadiene based rubber as (A) the base rubber.

In NBR, XNBR, HNBR and HXNBR, the amount of acrylonitrile is preferably 15 mass % or more, more preferably 18 mass % or more, even more preferably 21 mass % or more, and is preferably 50 mass % or less, more preferably 45 mass % or less, even more preferably 40 mass % or less. If the amount of acrylonitrile is 15 mass % or more, the grip shows better abrasion resistance, and if the amount of acrylonitrile is 50 mass % or less, the grip shows a better touch feeling in a cold region or in winter.

In HNBR and HXNBR, the amount of a double bond is preferably 0.09 mmol/g or more, more preferably 0.2 mmol/g or more, and is preferably 2.5 mmol/g or less, more preferably 2.0 mmol/g or less, even more preferably 1.5 mmol/g or less. If the amount of the double bond is 0.09 mmol/g or more, vulcanization is easily carried out during molding and the grip shows an enhanced tensile strength, and if the amount of the double bond is 2.5 mmol/g or less, the grip shows better durability (weather resistance) and tensile strength. The amount of the double bond can be adjusted by the amount of butadiene in the copolymer or the amount of hydrogen added into the copolymer.

Examples of the monomer having a carboxyl group in XNBR and HXNBR include acrylic acid, methacrylic acid, fumaric acid, and maleic acid. In XNBR and HXNBR, the amount of the monomer having a carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the amount of the monomer having a carboxyl group is 1.0 mass % or more, the grip shows better abrasion resistance, and if the amount of the monomer having a carboxyl group is 30 mass % or less, the grip shows a better touch feeling in a cold region or in winter.

In XNBR and HXNBR, the content of the carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the content of the carboxyl group is 1.0 mass % or more, the grip shows better abrasion resistance, and if the content of the carboxyl group is 30 mass % or less, the grip shows a better touch feeling in a cold region or winter.

(B) Resin (B) The resin has a softening point in a range from 5° C. to 120° C. (B) The resin is sufficiently softened during kneading the surface layer rubber composition, and thus exhibits good dispersibility in (A) the base rubber. In addition, softening of (B) the resin is suppressed even if the outermost surface layer is stored at room temperature after it is formed from the surface layer rubber composition, and thus bleeding out of (B) the resin on the outermost surface layer is prevented.

The softening point of (B) the resin is more preferably 10° C. or more, even more preferably 15° C. or more, and is more preferably 115° C. or less, even more preferably 110° C. or less, most preferably 100° C. or less.

(B) The resin is at least one type selected from the group consisting of a hydrogenated rosin ester, a disproportionated rosin ester, an ethylene-vinyl acetate copolymer, a coumarone resin, a phenol resin, a xylene resin and a styrene resin. These resins may be used solely, or two or more of them may be used in combination.

The hydrogenated rosin ester and the disproportionated rosin ester are so-called stabilized rosin esters. The rosin is a natural resin containing abietic acid, neoabietic acid, palustric acid, pimaric acid, isopimaric acid and dehydroabietic acid. The rosin ester is an ester compound obtained by a reaction between the above rosin and an alcohol.

Examples of the alcohol include a monohydric alcohol such as n-octyl alcohol, 2-ethylhexyl alcohol, decyl alcohol, lauryl alcohol and stearyl alcohol; a dihydric alcohol such as ethylene glycol, diethylene glycol, polyethylene glycol, propylene glycol, dipropylene glycol, polypropylene glycol and neopentyl glycol; a trihydric alcohol such as glycerin and trimethylolpropane; a tetrahydric alcohol such as pentaerythritol and diglycerin; and a hexahydric alcohol such as dipentaerythritol and sorbitol. Among them, the polyhydric alcohol such as the dihydric alcohol or higher alcohol is preferred, and glycerin is more preferred.

The hydrogenated rosin ester is an ester compound in which the part derived from the rosin of the rosin ester is hydrogenated. The hydrogenated rosin ester may be obtained by a method of hydrogenating the rosin and then causing a reaction between the obtained hydrogenated rosin and an alcohol, or by a method of causing a reaction between the rosin and an alcohol and then hydrogenating the obtained rosin ester.

The disproportionated rosin ester is an ester compound in which the part derived from the rosin of the rosin ester is disproportionated. The disproportionated rosin ester may be obtained by a method of disproportionating the rosin and then causing a reaction between the obtained disproportionated rosin and an alcohol, or by a method of causing a reaction between the rosin and an alcohol and then disproportionating the obtained rosin ester.

The acid value of the hydrogenated rosin ester and disproportionated rosin ester is preferably 2 mgKOH/g or more, more preferably 4 mgKOH/g or more, even more preferably 6 mgKOH/g or more, and is preferably 200 mgKOH/g or less, more preferably 180 mgKOH/g or less, even more preferably 160 mgKOH/g or less. If the acid value is 2 mgKOH/g or more, the hydrogenated rosin ester and the disproportionated rosin ester exhibit better compatibility with the acrylonitrile-butadiene based rubber, and if the acid value is 200 mgKOH/g or less, the carboxyl group of the hydrogenated rosin ester and disproportionated rosin ester almost has no influence on the vulcanization reaction of the base rubber.

A commercial product may be used as the hydrogenated rosin ester and the disproportionated rosin ester, and examples of the commercial product include HARITACK SE10, PH, F85, F105, FK100 (available from Harima Chemicals Group, Inc.).

The amount of vinyl acetate in the ethylene-vinyl acetate copolymer is preferably 10 mass % or more, more preferably 12 mass % or more, even more preferably 15 mass % or more, and is preferably 80 mass % or less, more preferably 75 mass % or less, even more preferably 70 mass % or less. If the amount of vinyl acetate is 10 mass % or more, the effect of improving the grip performance of the outermost surface layer under a wet condition is better, and if the amount of vinyl acetate is 80 mass % or less, lowering in the abrasion resistance of the outermost surface layer is suppressed.

A commercial product may be used as the ethylene-vinyl acetate copolymer, and examples of the commercial product include Ultrasen (registered trademark) 680, 681, 720, 722, 750, 760 (available from Tosoh Corporation), and Levapren (registered trademark) 400, 450, 500, 600, 700, 800 (available from Lanxess Corporation).

The coumarone resin is a resin containing coumarone or a derivate thereof as a monomer component. As the coumarone resin, a coumarone-indene resin is preferred. The coumarone-indene resin is a copolymer that contains a coumarone or a derivate thereof and an indene or a derivate thereof as a monomer component in a total amount of 50 mass % or more in all the monomer components. Examples of the coumarone or the derivate thereof include coumarone and methylcoumarone. The amount of the coumarone or the derivate thereof in all the monomer components preferably ranges from 1 mass % to 20 mass %. Examples of the indene or the derivate thereof include indene and methylindene. The amount of the indene or the derivate thereof in all the monomer components preferably ranges from 40 mass % to 95 mass %. The coumarone-indene resin may further contain a monomer component other than the coumarone or the derivate and the indene or the derivate. Examples of the other monomer component include styrene, vinyl toluene, and dicyclopentadiene.

A hydroxyl group may be introduced in the coumarone-indene resin. In this case, the hydroxyl value of the coumarone-indene resin is preferably 10 mgKOH/g or more, more preferably 15 mgKOH/g or more, even more preferably 20 mgKOH/g or more, and is preferably 150 mgKOH/g or less, more preferably 140 mgKOH/g or less, even more preferably 130 mgKOH/g or less. If the hydroxyl value falls within the above range, the coumarone-indene resin exhibit better compatibility with the base rubber.

A commercial product may be used as the coumarone-indene resin, and examples of the commercial product include Nittoresin (registered trademark) G-90 (available from Nitto Chemical Co., Ltd.), and NOVARES C10 (available from Rutgers Chemicals Corporation).

(B) The resin preferably has an ester group in the molecule thereof. If (B) the resin has an ester group, (B) the resin has better dispersibility in (A) the base rubber. It is noted that the hydrogenated rosin ester, the disproportionated rosin ester and the ethylene-vinyl acetate copolymer have an ester group in the molecule thereof.

When (A) the base rubber contains the carboxyl-modified acrylonitrile-butadiene rubber and/or the carboxyl-modified hydrogenated acrylonitrile-butadiene rubber, (B) the resin preferably has no hydroxyl group in the molecule thereof. In addition, when (A) the base rubber contains the carboxyl-modified acrylonitrile-butadiene rubber and/or the carboxyl-modified hydrogenated acrylonitrile-butadiene rubber, (B) the resin preferably has a carboxyl group in the molecule thereof.

The amount of (B) the resin is preferably 2 parts by mass or more, more preferably 4 parts by mass or more, even more preferably 5 parts by mass or more, and is preferably 40 parts by mass or less, more preferably 35 parts by mass or less, even more preferably 30 parts by mass or less, most preferably 20 parts by mass or less, with respect to 100 parts by mass of (A) the base rubber. If the amount of (B) the resin is 2 parts by mass or more, the grip performance of the obtained grip under a wet condition is further enhanced, and if the amount of (B) the resin is 40 parts by mass or less, lowering in the mechanical strength of the grip is suppressed, and thus the obtained grip has better durability.

The surface layer rubber composition preferably contains a crosslinking agent in addition to (A) the base rubber and (B) the resin. As the crosslinking agent, a sulfur crosslinking agent or an organic peroxide can be used. Examples of the sulfur crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, $\alpha,\alpha'$-bis(t-butylperoxy-m-diisopropyl) benzene, 2,5-dimethyl-2,5-di(t-butylperoxy) hexane, and 1,1-bis(t-butylperoxy)-3,3,5-trimethylcyclohexane. The crosslinking agent may be used solely, or two or more of them may be used in combination. As the crosslinking agent, the sulfur crosslinking agent is preferred, and the elemental sulfur is more preferred. The amount of the crosslinking agent is preferably 0.2 part by mass or more, more preferably 0.4 part by mass or more, even more preferably 0.6 part by mass or more, and is preferably 4.0 parts by mass or less, more preferably 3.5 parts by mass or less, even more preferably 3.0 parts by mass or less, with respect to 100 parts by mass of (A) the base rubber.

The surface layer rubber composition preferably further contains a vulcanization accelerator or a vulcanization activator.

Examples of the vulcanization accelerator include thiurams such as tetramethylthiuram disulfide (TMTD), tetrabenzylthiuram disulfide (TBzTD), tetramethylthiuram monosulfide (TMTM), and dipentamethylenethiuram tetrasulfide; guanidines such as diphenylguanidine (DPG); dithiocarbamates such as zinc dimethyldithiocarbamate (Zn-PDC), and zinc dibutyldithiocarbamate; thioureas such as trimethylthiourea, and N,N'-diethylthiourea; thiazoles such as mercaptobenzothiazole (MBT), and benzothiazole disulfide; sulfenamides such as N-cyclohexyl-2-benzothiazolylsulfenamide (CBS), and N-t-butyl-2-benzothiazolylsulfenamide (BBS); and the like. These vulcanization accelerators may be used solely, or two or more of them may be used in combination. The amount of the vulcanization accelerator is preferably 0.4 part by mass or more, more preferably 0.8 part by mass or more, even more preferably 1.2 parts by mass or more, and is preferably 8.0 parts by mass or less, more preferably 7.0 parts by mass or less, even more preferably 6.0 parts by mass or less, with respect to 100 parts by mass of (A) the base rubber.

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination. The amount of the vulcanization activator is preferably 0.5 part by mass or more, more preferably 0.6 part by mass or more, even more preferably 0.7 part by mass or more, and is preferably 10.0 parts by mass or less, more preferably 9.5 parts by mass or less, even more preferably 9.0 parts by mass or less, with respect to 100 parts by mass of (A) the base rubber.

The surface layer rubber composition may further contain a reinforcing material, antioxidant, softening agent, coloring agent, antiscorching agent and the like, where necessary.

Examples of the reinforcing material include carbon black and silica. The amount of the reinforcing material is preferably 2.0 parts by mass or more, more preferably 3.0 parts by mass or more, even more preferably 4.0 parts by mass or more, and is preferably 50 parts by mass or less, more preferably 45 parts by mass or less, even more preferably 40 parts by mass or less, with respect to 100 parts by mass of (A) the base rubber.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-$\alpha$-napthylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, even more preferably 0.4 part by mass or more, and is preferably 5.0 parts by mass or less, more preferably 4.8 parts by mass or less, even more preferably 4.6 parts by mass or less, with respect to 100 parts by mass of (A) the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the antiscorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio)phthalimide, sulfonamide derivative, diphenyl urea, bis(tridecyl)pentaerythritol diphosphite, and 2-mercaptobenzimidazole.

The surface layer rubber composition may be prepared by a conventionally known method, for example, by kneading raw materials with a kneading machine such as Banbury mixer, kneader, and open roll. The temperature (material temperature) when kneading the raw materials is preferably higher than the softening point of (B) the resin. In this case, the temperature difference between the material temperature of kneading the raw materials and the softening point of (B) the resin (material temperature−softening point of (B) the resin) is preferably 10° C. or more, more preferably 15° C. or more, and is preferably 30° C. or less, more preferably 25° C. or less.

In addition, when the surface layer rubber composition contains microballoons which will be described later, it is preferred that the components ((A) the base rubber, (B) the resin, and other components) except the microballoons are kneaded in advance, and then the kneaded product is further kneaded with the microballoons. The material temperature of kneading the kneaded product and the microballoons is preferably lower than the expansion starting temperature of the microballoons.

The outermost surface layer may be a solid layer or a porous layer. If the outermost surface layer is a porous layer, the grip for sporting goods has a light weight. The porous layer is a layer comprising many fine pores (voids) in a rubber which is a base material. If many fine pores are formed, the layer has a small apparent density, and thus has a light weight.

Examples of the method producing the porous layer include a balloon foaming method, chemical foaming method, supercritical carbon dioxide injection molding method, salt extraction method, and solvent removing method. In the balloon foaming method, microballoons are allowed to be contained in the rubber composition, and then be expanded by heating to perform foaming. In addition, the expanded microballoons may be blended in the rubber composition, and then the resultant rubber composition is molded. In the chemical foaming method, a foaming agent (such as azodicarbonamide, azobisisobutyronitrile, N,N'-dinitrosopentamethylenetetramine, p-toluenesulfonyl hydrazine, and p-oxybis(benzenesulfonohydrazide)) and a foaming auxiliary are allowed to be contained in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and carbon dioxide is gasified to perform foaming. In the salt extraction method, a soluble salt (such as boric acid and calcium chloride) is allowed to be contained in the rubber composition, and then the salt is dissolved and extracted after molding to form fine pores. In the solvent removing method, a solvent is allowed to be contained in the rubber composition, and then the solvent is removed after molding to form fine pores.

When the outermost surface layer is a porous layer, a foamed layer formed from a surface layer rubber composition containing a foaming agent is preferred. In particular, a foamed layer formed by the balloon foaming method is preferred. In other words, the outermost surface layer is preferably a foamed layer formed from a surface layer rubber composition containing microballoons. If the microballoons are used, the outermost surface layer has a light weight while maintaining the mechanical strength thereof.

As the microballoons, organic microballoons or inorganic microballoons may be used. Examples of the organic microballoons include hollow particles formed from a thermoplastic resin, and resin capsules encapsulating a hydrocarbon having a low boiling point in a shell formed from a thermoplastic resin. Specific examples of the resin capsules include Expancel (registered trademark) available from Akzo Nobel Company, and Matsumoto Microsphere (registered trademark) available from Matsumoto Yushi Seiyaku Co., Ltd. Examples of the inorganic microballoons include hollow glass particles (such as silica balloons and alumina balloons), and hollow ceramic particles.

The volume average particle size of the resin capsules (before expansion) is preferably 5 μm or more, more preferably 6 μm or more, even more preferably 9 μm or more, and is preferably 90 μm or less, more preferably 70 μm or less, even more preferably 60 μm or less.

When the outermost surface layer is formed by the balloon foaming method, the amount of the microballoons in the surface layer rubber composition is preferably 1.0 part by mass or more, more preferably 1.2 parts by mass or more, even more preferably 1.5 parts by mass or more, and is preferably 10 parts by mass or less, more preferably 8 parts by mass or less, even more preferably 6 parts by mass or less, with respect to 100 parts by mass of (A) the base rubber. If the amount of the microballoons is 1.0 part by mass or more, foaming can be performed more uniformly at the time of forming the porous layer, and if the amount of the microballoons is 10 parts by mass or less, the porous layer strikes a good balance between the light weight and the mechanical strength.

In addition, the foaming ratio of the outermost surface layer formed by the balloon foaming method is preferably 1.1 or more, more preferably 1.2 or more, and is preferably 2.0 or less, more preferably 1.8 or less, even more preferably 1.5 or less. If the foaming ratio is 1.1 or more, the grip shows a greater effect of reducing the weight, and if the foaming ratio is 2.0 or less, lowering in the mechanical strength of the outermost surface layer is suppressed.

When the outermost surface layer is a porous layer, the density ($D_{out}$) of the outermost surface layer is preferably 0.6 g/cm$^3$ or more, more preferably 0.65 g/cm$^3$ or more, even more preferably 0.7 g/cm$^3$ or more, and is preferably 1.1 g/cm$^3$ or less, more preferably 1.05 g/cm$^3$ or less, even more preferably 1.0 g/cm$^3$ or less. If the density of the outermost surface layer is 0.6 g/cm$^3$ or more, the surface layer has better abrasion resistance, and if the density of the outermost surface layer is 1.1 g/cm$^3$ or less, the effect of reducing the weight of the grip by the porous layer becomes greater.

The material hardness (Shore A hardness) of the surface layer rubber composition is preferably 30 or more, more preferably 40 or more, even more preferably 45 or more, and is preferably 80 or less, more preferably 70 or less, even more preferably 60 or less. If the material hardness (Shore A hardness) of the surface layer rubber composition is 30 or more, the outermost surface layer has an enhanced mechanical strength, and if the material hardness (Shore A hardness) of the surface layer rubber composition is 80 or less, the outermost surface layer does not become excessively hard and thus the grip feeling when holding the grip becomes better.

[Other Portion]

The material for forming the other portion of the grip for sporting goods than the portion formed from the above surface layer rubber composition is not particularly limited. Examples of the composition for forming the other portion (hereinafter occasionally referred to as "inner layer composition") include a rubber composition and a resin composition.

The rubber composition preferably contains a base rubber and a crosslinking agent. Examples of the base rubber include a natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), carboxyl-modified hydrogenated acrylonitrile-butadiene rubber (HXNBR), butadiene rubber (BR), styrene-butadiene rubber (SBR), polyurethane rubber (PU), isoprene rubber (IR), chloroprene rubber (CR), and ethylene-propylene rubber (EPM). Among them, NR, EPDM, IIR, NBR, HNBR, XNBR, HXNBR, BR, SBR, and PU are preferred as the base rubber.

Examples of the crosslinking agent of the rubber composition include the same one as those employed in the surface layer rubber composition, and the elemental sulfur is preferred. The rubber composition preferably further contains a vulcanization accelerator and a vulcanization activator. Examples of these vulcanization accelerator and vulcanization activator include the same one as those employed in the surface layer rubber composition. As the vulcanization accelerator, N-t-butyl-2-benzothiazolylsulfenamide and tetrabenzylthiuram disulfide are preferred. As the vulcanization activator, zinc oxide and stearic acid are preferred.

The rubber composition may further contain a reinforcing material, antioxidant, softening agent, coloring agent, antiscorching agent and the like, where necessary. Examples of the reinforcing material, antioxidant and coloring agent include the same one as those employed in the surface layer rubber composition. As the reinforcing material, carbon black and silica are preferred. As the antioxidant, 2,2'-methylene bis(4-methyl-6-t-butylphenol) is preferred.

The rubber composition may be prepared by a conventionally known method, for example, by kneading raw materials using a kneading machine such as Banbury mixer, kneader, and open roll. The temperature (material temperature) performing the kneading operation preferably ranges from 70° C. to 160° C. It is noted that when the rubber composition contains microballoons, the kneading operation is preferably performed at a temperature lower than the expansion starting temperature of the microballoons.

The resin composition contains a base resin. Examples of the base resin include a polyurethane resin, polystyrene resin, polyethylene resin, polypropylene resin, ethylene-vinyl acetate copolymer resin, and polyethylene terephthalate resin.

The composition for forming the other portion is preferably the rubber composition, and preferably contains the acrylonitrile-butadiene based rubber as the base rubber. The amount of the acrylonitrile-butadiene based rubber in the base rubber of the rubber composition is preferably 50 mass % or more, more preferably 60 mass % or more, and even more preferably 70 mass % or more. In addition, it is also preferred that the base rubber of the rubber composition consists of the acrylonitrile-butadiene based rubber. If the composition for forming the other portion contains the acrylonitrile-butadiene based rubber, the adhesion between the portion formed from the above surface layer rubber composition and the other portion is enhanced.

In particular, it is preferred that the principal component in the base rubber of the rubber composition for forming the other portion is same as the principal component in (A) the base rubber of the above surface layer rubber composition. If the principal component in the base rubber of the rubber composition for forming the other portion is same as the principal component in (A) the base rubber of the above surface layer rubber composition, the adhesion between the portion formed from the above surface layer rubber composition and the other portion is further enhanced. It is noted that the principal component in the base rubber is the rubber type used in the largest amount in the base rubber.

The other portion may be a solid layer or a porous layer. In case of a porous layer, the other portion is preferably a foamed layer formed from a rubber composition containing microballoons. If the microballoons are used, the other portion has a light weight while maintaining the mechanical strength thereof. Examples of the microballoons include the same one as those employed in the above surface layer rubber composition, and the resin capsules encapsulating a hydrocarbon having a low boiling point in a shell formed from a thermoplastic resin is preferred.

[Construction]

The shape of the grip for sporting goods is not particularly limited, and a grip for sporting goods having a cylindrical portion is preferred. If the grip for sporting goods has a cylindrical portion, a shaft or the like can be inserted into the cylindrical portion. Further, the cylindrical portion may have a single-layered structure or a multi-layered structure. When the cylindrical portion has a single-layered structure, the whole cylindrical portion is formed from the above surface layer rubber composition. When the cylindrical portion has a multi-layered structure, at least one part of the outermost surface layer or the whole outermost surface layer is formed from the above surface layer rubber composition.

The thickness of the cylindrical portion is preferably 0.5 mm or more, more preferably 1.0 mm or more, even more preferably 1.5 mm or more, and is preferably 17.0 mm or less, more preferably 10.0 mm or less, even more preferably 8.0 mm or less. The cylindrical portion may be formed with a fixed thickness along the axis direction, or may be formed with a thickness gradually becoming thicker from the front end part toward the back end part.

The grip for sporting goods preferably has a dual-layered cylindrical portion composed of a cylindrical inner layer and a cylindrical outer layer covering the cylindrical inner layer. If the cylindrical portion has a dual-layered structure, the mechanical properties of the cylindrical portion are easily controlled. It is preferred that at least one part of the cylindrical outer layer is formed from the above surface layer rubber composition, and it is more preferred that the whole cylindrical outer layer is formed from the above surface layer rubber composition.

The cylindrical outer layer and the cylindrical inner layer may have a uniform thickness, or may have a varied thickness. For example, the cylindrical outer layer and the cylindrical inner layer may be formed with a thickness gradually becoming thicker from one end toward another end along the axis direction of the cylindrical grip. The cylindrical outer layer preferably has a uniform thickness.

When the cylindrical portion has a thickness in a range from 0.5 mm to 17.0 mm, the thickness of the cylindrical outer layer is preferably 0.5 mm or more, more preferably 0.6 mm or more, even more preferably 0.7 mm or more, and is preferably 2.5 mm or less, more preferably 2.3 mm or less, even more preferably 2.1 mm or less. If the thickness of the cylindrical outer layer is 0.5 mm or more, the reinforcing effect by the outer layer material becomes greater, and if the thickness of the cylindrical outer layer is 2.5 mm or less, the cylindrical inner layer can be relatively thickened and thus the effect of reducing the weight of the grip becomes greater.

The percentage ((thickness of cylindrical outer layer/thickness of cylindrical portion)×100) of the thickness of the cylindrical outer layer to the thickness of the cylindrical portion is preferably 0.5% or more, more preferably 1.0% or more, even more preferably 1.5% or more, and is preferably 99.0% or less, more preferably 98.0% or less, even more preferably 97.0% or less. If the above percentage is 0.5% or more, the reinforcing effect by the outer layer material becomes greater, and if the above percentage is 99.0% or less, the cylindrical inner layer can be relatively thickened and thus the effect of reducing the weight of the grip becomes greater.

The material hardness (Shore A hardness) of the inner layer composition is preferably 10 or more, more preferably 15 or more, even more preferably 20 or more, and is preferably 80 or less, more preferably 70 or less, even more preferably 60 or less. If the material hardness (Shore A hardness) of the inner layer composition is 10 or more, the cylindrical inner layer does not become excessively soft and thus a tightly fixed touch feeling can be obtained when holding the grip, and if the material hardness (Shore A hardness) of the inner layer composition is 80 or less, the cylindrical inner layer does not become excessively hard and thus the grip feeling when holding the grip becomes better.

The material hardness $H_{out}$ (Shore A hardness) of the outer layer rubber composition is preferably equal to or larger than the material hardness $H_{in}$ (Shore A hardness) of the inner layer composition. In this case, the hardness difference between them ($H_{out}-H_{in}$) (Shore A hardness) is preferably 0 or more, more preferably 10 or more, even more preferably 20 or more, and is preferably 65 or less, more preferably 60 or less, even more preferably 55 or less. If the above hardness difference ($H_{out}-H_{in}$) falls within the above range, the grip feeling when holding the grip becomes better.

The density ($D_{in}$) of the cylindrical inner layer is preferably smaller than the density ($D_{out}$) of the cylindrical outer layer ($D_{in}<D_{out}$). If such the construction is adopted, the resultant grip has a greater strength and a lighter weight.

The cylindrical inner layer is preferably formed from the rubber composition containing the acrylonitrile-butadiene based rubber as the base rubber. In addition, as the combination of the material of the cylindrical outer layer and the material of the cylindrical inner layer, an embodiment in which the principal component in the base rubber of the cylindrical outer layer is same as the principal component in the base rubber of the cylindrical inner layer, is preferred. Specifically, examples of the combination include an embodiment in which both the principal component in the base rubber of the cylindrical outer layer and the principal component in the base rubber of the cylindrical inner layer are NBR; an embodiment in which both the principal component in the base rubber of the cylindrical outer layer and the principal component in the base rubber of the cylindrical inner layer are HNBR; an embodiment in which both the principal component in the base rubber of the cylindrical outer layer and the principal component in the base rubber of the cylindrical inner layer are XNBR; an embodiment in which both the principal component in the base rubber of the cylindrical outer layer and the principal component in the base rubber of the cylindrical inner layer are HXNBR; and the like.

Examples of the combination of the cylindrical outer layer and the cylindrical inner layer include a combination of a solid outer layer and a solid inner layer, a combination of a solid outer layer and a porous inner layer, and a combination of a porous outer layer and a porous inner layer. Among them, the combination of the solid outer layer and the porous inner layer, and the combination of the porous outer layer and the porous inner layer are preferred. If the cylindrical inner layer is porous, the grip has a light weight but the cylindrical inner layer has a lowered mechanical strength. However, since the surface layer rubber composition has an excellent mechanical strength, the mechanical strength of the grip can be maintained even the cylindrical inner layer is porous.

The cylindrical inner layer is preferably a porous layer, and more preferably a foamed layer formed by the balloon foaming method. When the cylindrical inner layer is formed by the balloon foaming method, the amount of the microballoons in the inner layer composition is preferably 5 parts by mass or more, more preferably 8 parts by mass or more, even more preferably 12 parts by mass or more, and is preferably 20 parts by mass or less, more preferably 18 parts by mass or less, even more preferably 15 parts by mass or less, with respect to 100 parts by mass of the base material (base rubber or base resin). If the amount of the microballoons is 5 parts by mass or more, the effect of reducing the weight of the grip becomes greater, and if the amount of the microballoons is 20 parts by mass or less, lowering in the mechanical strength of the cylindrical inner layer is suppressed.

In addition, the foaming ratio of the cylindrical inner layer formed by the balloon foaming method is preferably 1.2 or more, more preferably 1.5 or more, even more preferably 1.8 or more, and is preferably 5.0 or less, more preferably 4.5 or less, even more preferably 4.0 or less. If the foaming ratio is 1.2 or more, the effect of reducing the weight of the grip becomes greater, and if the foaming ratio is 5.0 or less, lowering in the mechanical strength of the cylindrical inner layer is suppressed.

When both the cylindrical outer layer and the cylindrical inner layer are foamed layers, it is preferred that the foaming ratio of the cylindrical outer layer is lower than the foaming ratio of the cylindrical inner layer. Further, in this case, the ratio of the foaming ratio of the cylindrical inner layer to the foaming ratio of the cylindrical outer layer (cylindrical inner layer/cylindrical outer layer) is preferably 1.1 or more, more preferably 1.5 or more, even more preferably 2.0 or more, and is preferably 10.0 or less, more preferably 9.0 or less, even more preferably 8.0 or less.

When the cylindrical inner layer is a porous layer, the density ($D_{in}$) of the cylindrical inner layer is preferably 0.20 g/cm$^3$ or more, more preferably 0.22 g/cm$^3$ or more, even more preferably 0.25 g/cm$^3$ or more, and is preferably 0.50 g/cm$^3$ or less, more preferably 0.48 g/cm$^3$ or less, even more preferably 0.45 g/cm$^3$ or less. If the density of the cylindrical inner layer is 0.20 g/cm$^3$ or more, the cylindrical inner layer does not excessively deform and thus a stronger hitting feeling can be obtained, and if the density of the cylindrical inner layer is 0.50 g/cm$^3$ or less, the effect of reducing the weight of the grip by the porous layer becomes greater.

When both the cylindrical inner layer and the cylindrical outer layer are porous layers, the density ratio between them ($D_{out}/D_{in}$) is preferably 1.6 or more, more preferably 1.8 or more, even more preferably 2.0 or more, and is preferably 4.5 or less, more preferably 4.3 or less, even more preferably 4.0 or less.

The golf club grip may be obtained by molding the above surface layer rubber composition in a mold. Examples of the molding method include a press molding method and an injection molding method. In addition, the golf club grip comprising an inner layer and an outer layer may be obtained, for example, by press molding a laminated product composed of an unvulcanized rubber sheet formed from the above surface layer rubber composition and an unvulcanized rubber sheet formed from the above inner layer rubber composition in a mold. When the press molding method is adopted, the temperature of the mold preferably ranges from 140° C. to 200° C., the molding time preferably ranges from 5 minutes to 40 minutes, and the molding pressure preferably ranges from 0.1 MPa to 100 MPa.

[Sporting Goods]

The grip for sporting goods according to the present invention can be used as a golf club grip, fishing rod grip, bat (baseball bat, softball bat, and cricket bat) grip, stock (ski stock and walking stock) grip, and the like.

[Golf Club Grip]

The golf club grip will be described as one example of the grip for sporting goods according to the present invention. Examples of the shape of the golf club grip include a shape having a cylindrical portion for inserting a shaft and an integrally molded cap portion for covering the opening of the back end of the cylindrical portion, wherein an outermost surface layer of the cylindrical portion is formed from a surface layer rubber composition, and wherein the surface layer rubber composition contains (A) a base rubber and (B) a resin having a softening point in a range from 5° C. to 120° C., (A) the base rubber contains an acrylonitrile-butadiene based rubber, and (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin. In addition, the cylindrical portion preferably has a laminated construction composed of an inner layer and an outer layer. In this case, the outer layer is formed from the above surface layer rubber composition.

The cylindrical portion may be formed with a fixed thickness along the axis direction, or may be formed with a thickness gradually becoming thicker from the front end part toward the back end part. In addition, the cylindrical portion may be formed with a fixed thickness along the diameter direction, or a projecting strip part (so-called back line) may be formed on a part of the cylindrical portion. Furthermore, a groove may be formed on the surface of the cylindrical portion. Formation of a water film between the hand of the golfer and the grip may be suppressed by the groove, and thus the grip performance under a wet condition is further enhanced. In addition, in view of the anti-slip performance and abrasion resistance of the grip, a reinforcing cord may be disposed in the grip.

The mass of the golf club grip is preferably 16 g or more, more preferably 18 g or more, even more preferably 20 g or more, and is preferably 35 g or less, more preferably 32 g or less, even more preferably 30 g or less.

[Golf Club]

A golf club using the above grip for sporting goods is also included in the present invention. The golf club comprises a shaft, a head provided on one end of the shaft, and a grip provided on another end of the shaft, wherein the grip is the above-described grip for sporting goods. The shaft can be made of stainless steel or a carbon fiber reinforcing resin. Examples of the head include a wood type, utility type, and iron type. The material constituting the head is not particularly limited, and examples thereof include titanium, titanium alloy, carbon fiber reinforcing plastic, stainless steel, maraging steel, and soft iron.

Next, the golf club grip and the golf club will be explained with reference to figures. FIG. 1 is a perspective view showing one example of a golf club grip. A grip 1 comprises a cylindrical portion 2 for inserting a shaft therein, and an integrally molded cap portion 3 for covering the opening of the back end of the cylindrical portion.

Figure 2:
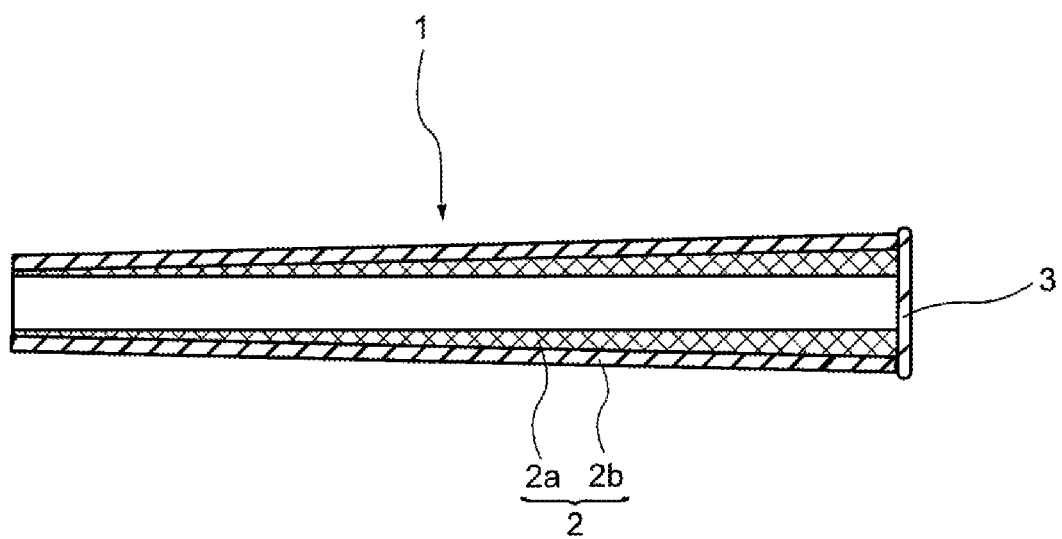
FIG. 2 is a schematic cross-sectional view showing one example of a golf club grip.

FIG. 2 is a schematic cross-sectional view showing one example of a golf club grip. The cylindrical portion 2 is composed of an inner layer 2a and an outer layer 2b. The outer layer 2b is formed with a uniform thickness throughout the entire region from the front end part to the back end part. The inner layer 2a is formed with a thickness gradually becoming thicker from the front end part toward the back end part. In the grip 1 shown in FIG. 2, the cap portion 3 is formed from the same rubber composition as that used in the outer layer 2b.

Figure 3:
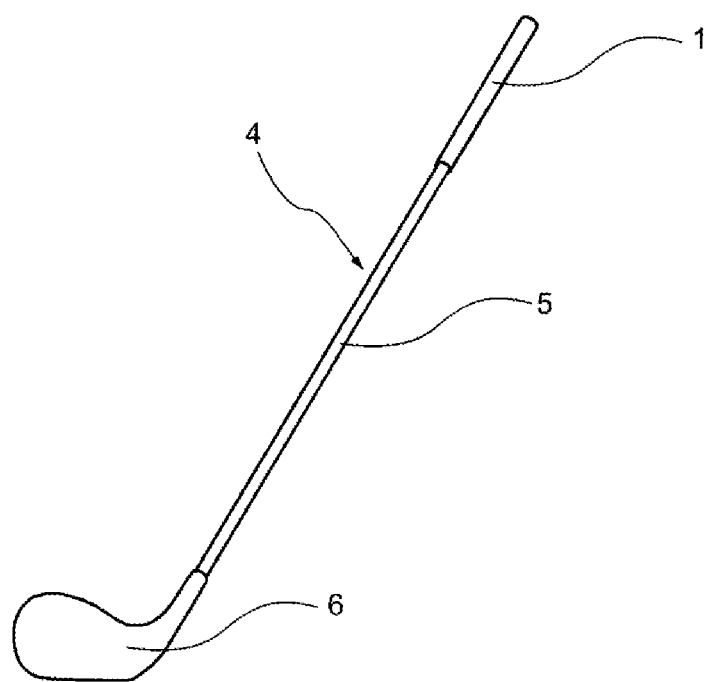
FIG. 3 is a perspective view showing one example of a golf club.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical portion 2 of the grip 1.

EXAMPLES

Hereinafter, the present invention will be described in detail by way of examples. However, the present invention is not limited to the examples described below, and various changes and modifications can be made in accordance with the spirit of the present invention and are included in the technical scope of the present invention.

[Evaluation Method]

(1) Softening Point

The softening point of the resin was measured with a ring and ball type softening point tester prescribed in JIS K 6220-1 (2015).

(2) Amount of Acrylonitrile

The amount of the acrylonitrile in the acrylonitrile-butadiene rubber before hydrogenation was measured according to ISO 24698-1 (2008).

(3) Amount of Double Bond (Mmol/g)

The amount of the double bond was calculated from the amount (mass %) of the butadiene in the copolymer and the amount (%) of the residual double bond. The amount of the residual double bond is a mass ratio (amount of the double bond after hydrogenation/amount of the double bond before hydrogenation) of the double bond in the copolymer after hydrogenation to the double bond in the copolymer before hydrogenation, and can be measured by infrared spectroscopy. When the acrylonitrile-butadiene rubber is the acrylonitrile-butadiene binary copolymer, the amount of the butadiene in the copolymer is calculated by subtracting the amount (mass %) of the acrylonitrile from 100.

$$\text{Amount of double bond} = \{\text{amount of butadiene}/45\} \times \text{amount of residual double bond} \times 10$$

(4) Amount of Monomer Having Carboxyl Group 1 g of the hydrogenated acrylonitrile-butadiene rubber was weighed and dissolved in 50 ml of chloroform, a thymol blue indicator was dripped therein. 0.05 mol/L sodium hydroxide methanol solution was dripped into the solution while the solution was stirred, and the dripping amount (V ml) at the time the solution color initially changed was recorded. Regarding 50 ml of a blank, i.e. chloroform not containing the hydrogenated acrylonitrile-butadiene rubber, thymol blue was used as the indicator, 0.05 mol/L sodium hydroxide methanol solution was dripped into the solution, and the dripping amount (B ml) at the time the solution color initially changed was recorded. The amount of the monomer having the carboxyl group is calculated according to the following formula.

$$\text{Amount of monomer having carboxyl group} = \{0.05 \times (V-B) \times PM\}/(10 \times X)$$

(In the formula, V: dripping amount (ml) of sodium hydroxide solution in test solution, B: dripping amount (ml) of sodium hydroxide solution in blank, PM: molecular weight of monomer having carboxyl group, X: valence of monomer having carboxyl group.)

(5) Material Hardness (Shore A Hardness)

Sheets with a thickness of 2 mm were formed by pressing the rubber composition at 160° C. for 8 to 20 minutes. It is noted that, in the case that the rubber composition contains the microballoons, the sheets were formed by expanding the microballoons in the same foaming ratio as that when forming the grip. These sheets were stored at 23° C. for two weeks. Three of these sheets were stacked on one another so as not to be affected by the measuring base on which the sheets were placed, and the hardness of the stack was measured with an automatic hardness tester (Digitest II, available from Bareiss company) using a testing device of "Shore A".

(6) Foaming Ratio

The foamed layer which was the measuring sample, was cut from the grip, and the density (d1) of the foamed layer was measured. Further, an unfoamed rubber sheet was produced by using the rubber composition used for forming this foamed layer, and the density (d2) of the rubber sheet was measured. The foaming ratio (d2/d1) was calculated by dividing the density of the unfoamed sheet by the density of the foamed layer. It is noted that the density was measured with an auto gravimeter (SP-GR1 available from MS-TEC Co. Ltd., based on Archimedes' principle).

(7) Tensile Strength

The tensile strength was measured according to JIS K 6251 (2010). Specifically, a sample with a thickness of 2 mm was cut from the outer layer side of the grip. The sample was punched into a dumbbell shape (Dumbbell shape No. 3) to prepare a test piece, and physical properties of the test piece were measured (measuring temperature: 23° C., tensile speed: 500 mm/min) with a tensile tester (Autograph AGS-D available from SHIMADZU Corporation). Then, the tensile strength was calculated by dividing the ultimate tensile force recorded until the time the test piece was broken by the initial cross-sectional area of the test piece. It is noted that the tensile strength of Grip No. 2 was defined as an index of 100, and the tensile strength is a value represented by converting the tensile strength of each grip into this index.

(8) Grip Performance Under Wet Condition

The grip was installed on a shaft to obtain a golf club. Water was put on the grip to obtain a wet condition, and ten golfers were allowed to use the golf club and evaluate the anti-slipping performance in a five-grade scoring from "1" to "5". The grip that most hardly slipped was graded as "5", and the grip that most easily slipped was graded as "1". The average value of the evaluation values from ten golfers for each grip was calculated, the anti-slipping performance of Grip No. 2 was defined as an index of 100, and the anti-slipping performance is a value represented by converting the anti-slipping performance of each grip into this index.

(9) Abrasion Resistance

The abrasion resistance was evaluated with a Gakushin type abrasion tester (FR-2 available from Suga Test Instruments Co., Ltd). Specifically, a sample with a thickness of 2 mm was cut from the outer layer side of the grip, the sheet was punched into a rectangular shape with a length of 130 mm and a width of 35 mm to prepare a test piece, and the test piece was fixed on a test piece table. A sand paper (240 count) was provided on the front end of a friction block, and the region with a 100 mm length at the central part of the test piece was subjected to reciprocating friction for 500 times at a reciprocating speed of 30 times per minute under a load of 2 N. Then, the abrasion resistance was evaluated according to the mass change of the test piece before and after the test. The abrasion resistance of Grip No. 2 was defined as an index of 100, and the abrasion resistance is a value represented by converting the abrasion resistance of each grip into this index.

(10) Sustainability of Grip Performance Under Wet Condition

The golf club was prepared according to the same method as that in the above (8) grip performance under wet condition. In addition, after the molded grip was stored in an environment at a temperature of 50° C. and a humidity of 90% for one month, the surface of the grip was sufficiently washed with ethanol to prepare the grip after the storage under the high temperature and the high humidity. The grip after the storage under the high temperature and the high humidity was installed on a shaft to obtain a golf club. Ten golfers were allowed to use a golf club on which a conventional grip was installed and the golf club on which the grip after the storage under the high temperature and the high humidity was installed, and evaluate the difference of the grip performance between them in a five-grade scoring from "1" to "5". The difference of the grip performance that is smallest was graded as "5", and the difference of the grip performance that is largest was graded as "1". The average value of the evaluation values from ten golfers for each golf club was calculated, the golf club showing the average value of 3 points or more was evaluated as "G (good)" and the golf club showing the average value of less than 3 points was evaluated as "P (poor)".

[Production of Grip]

According to the formulations shown in Tables 1 and 2, raw materials were kneaded to prepare the outer layer rubber compositions and the inner layer rubber compositions. It is noted that, the outer layer rubber compositions No. A to D, F to L and N to V were prepared by kneading all the raw materials with Banbury mixer, and the outer layer rubber compositions No. E, M and the inner layer rubber compositions were prepared by kneading the raw materials except the microballoons with Banbury mixer and then blending the microballoons therein with a roll. The material temperature of kneading the outer layer rubber compositions A to F and the inner layer rubber compositions with the Banbury mixer was 70 to 160° C. The material temperature of kneading the outer layer rubber compositions No. G to V with the Banbury mixer was higher than the softening point of (B) the resin blended therein by 20° C. The material temperature of blending the microballoons by the roll was lower than the expansion starting temperature of the microballoons.

TABLE 1

| | | | \multicolumn{8}{c}{Outer rubber composition No.} | | | | | | | |
|---|---|---|---|---|---|---|---|---|---|---|
| | | | A | B | C | D | E | F | G | H |
| Formulation (parts by mass) | Base rubber | NR | 60 | — | — | — | — | — | — | — |
| | | EPDM | 40 | — | — | — | — | — | — | — |
| | | NBR | — | 100 | — | — | — | — | 100 | — |
| | | HNBR | — | — | 100 | — | — | — | — | 100 |
| | | XNBR | — | — | — | — | — | 100 | — | — |
| | | HXNBR | — | — | — | 100 | 100 | — | — | — |
| | Resin | HARITACK SE10 | — | — | — | — | — | — | 10 | 10 |
| | | HARITACK FK125 | — | — | — | — | — | — | — | — |
| | | Ultrasen 750 | — | — | — | — | — | — | — | — |
| | | Ultrasen 680 | — | — | — | — | — | — | — | — |
| | | Coumarone G-90 | — | — | — | — | — | — | — | — |
| | | NOVARES C10 | — | — | — | — | — | — | — | — |
| | | Koresin | — | — | — | — | — | — | — | — |
| | | Nisseki polybutene | — | — | — | — | — | — | — | — |
| | Crosslinking agent | Sulfur | 1.5 | 1.5 | 1.5 | 1.5 | 1.5 | 1.5 | 1.5 | 1.5 |
| | Vulcanization accelerator | NS | 1.9 | — | — | — | — | — | — | — |
| | | TMTD | — | 3 | 3 | 3 | 3 | 3 | 3 | 3 |
| | Vulcanization activator | Zinc oxide | 5 | 5 | 5 | — | — | — | 5 | 5 |
| | | Zinc peroxide | — | — | — | 5 | 5 | 5 | — | — |
| | | Stearic acid | 1 | 2 | 2 | 2 | 2 | 2 | 2 | 2 |
| | Reinforcing material | Carbon black | 2 | 5 | 5 | 5 | 5 | 5 | 5 | 5 |
| | | Silica | 10 | — | — | — | — | — | — | — |
| | Antioxidant | NS-6 | 2 | — | — | — | — | — | — | — |
| | | NDIBC | — | 1.5 | 1.5 | 1.5 | 1.5 | 1.5 | 1.5 | 1.5 |
| | Foaming agent | Microballoons | — | — | — | — | 1.5 | — | — | — |
| Acrylonitrile-butadiene rubber | | Amount of acrylonitrile (mass %) | — | 33.0 | 34.0 | 33.0 | 33.0 | 27.0 | 33.0 | 34.0 |
| | | Amount of double bond (mmol/g) | — | 12.4 | 0.49 | 0.40 | 0.40 | — | 12.4 | 0.49 |
| | | Amount of monomer having carboxyl group (mass %) | — | 0 | 0 | 5.0 | 5.0 | 7.5 | 0 | 0 |

| | | | \multicolumn{7}{c}{Outer rubber composition No.} | | | | | | |
|---|---|---|---|---|---|---|---|---|---|
| | | | I | J | K | L | M | N | O |
| Formulation (parts by mass) | Base rubber | NR | — | — | — | — | — | — | — |
| | | EPDM | — | — | — | — | — | — | — |
| | | NBR | — | — | — | — | — | — | — |
| | | HNBR | 100 | — | — | — | — | — | — |
| | | XNBR | — | 100 | — | — | — | — | — |
| | | HXNBR | — | — | 100 | 100 | 100 | 100 | 100 |
| | Resin | HARITACK SE10 | 20 | 10 | 10 | 20 | 10 | — | — |
| | | HARITACK FK125 | — | — | — | — | — | — | — |
| | | Ultrasen 750 | — | — | — | — | — | 10 | 20 |
| | | Ultrasen 680 | — | — | — | — | — | — | — |
| | | Coumarone G-90 | — | — | — | — | — | — | — |
| | | NOVARES C10 | — | — | — | — | — | — | — |
| | | Koresin | — | — | — | — | — | — | — |
| | | Nisseki polybutene | — | — | — | — | — | — | — |
| | Crosslinking agent | Sulfur | 1.5 | 1.5 | 1.5 | 1.5 | 1.5 | 1.5 | 1.5 |
| | Vulcanization accelerator | NS | — | — | — | — | — | — | — |
| | | TMTD | 3 | 3 | 3 | 3 | 3 | 3 | 3 |
| | Vulcanization activator | Zinc oxide | 5 | — | — | — | — | — | — |
| | | Zinc peroxide | — | 5 | 5 | 5 | 5 | 5 | 5 |
| | | Stearic acid | 2 | 2 | 2 | 2 | 2 | 2 | 2 |

TABLE 1-continued

|  |  |  |  |  |  |  |  |  |  |
|---|---|---|---|---|---|---|---|---|---|
| | Reinforcing material | Carbon black | 5 | 5 | 5 | 5 | 5 | 5 | 5 |
| | | Silica | — | — | — | — | — | — | — |
| | Antioxidant | NS-6 | — | — | — | — | — | — | — |
| | | NDIBC | 1.5 | 1.5 | 1.5 | 1.5 | 1.5 | 1.5 | 1.5 |
| | Foaming agent | Microballoons | — | — | — | — | 1.5 | — | — |
| Acrylonitrile-butadiene rubber | | Amount of acrylonitrile (mass %) | 34.0 | 27.0 | 33.0 | 33.0 | 33.0 | 33.0 | 33.0 |
| | | Amount of double bond (mmol/g) | 0.49 | — | 0.40 | 0.40 | 0.40 | 0.40 | 0.40 |
| | | Amount of monomer having carboxyl group (mass %) | 0 | 7.5 | 5.0 | 5.0 | 5.0 | 5.0 | 5.0 |

| | | | Outer rubber composition No. | | | | | | |
|---|---|---|---|---|---|---|---|---|---|
| | | | P | Q | R | S | T | U | V |
| Formulation (parts by mass) | Base rubber | NR | — | — | — | — | — | — | — |
| | | EPDM | — | — | — | — | — | — | — |
| | | NBR | — | — | — | — | — | — | — |
| | | HNBR | — | — | — | — | — | — | — |
| | | XNBR | — | — | — | — | — | — | — |
| | | HXNBR | 100 | 100 | 100 | 100 | 100 | 100 | 100 |
| | Resin | HARITACK SE10 | — | — | — | — | — | — | — |
| | | HARITACK FK125 | — | — | — | — | — | — | 10 |
| | | Ultrasen 750 | — | — | — | — | — | — | — |
| | | Ultrasen 680 | 10 | — | — | — | — | — | — |
| | | Coumarone G-90 | — | 10 | — | — | — | — | — |
| | | NOVARES C10 | — | — | 10 | — | — | — | — |
| | | Koresin | — | — | — | 5 | 10 | — | — |
| | | Nisseki polybutene | — | — | — | — | — | 10 | — |
| | Crosslinking agent | Sulfur | 1.5 | 1.5 | 1.5 | 1.5 | 1.5 | 1.5 | 1.5 |
| | Vulcanization accelerator | NS | — | — | — | — | — | — | — |
| | | TMTD | 3 | 3 | 3 | 3 | 3 | 3 | 3 |
| | Vulcanization activator | Zinc oxide | — | — | — | — | — | — | — |
| | | Zinc peroxide | 5 | 5 | 5 | 5 | 5 | 5 | 5 |
| | | Stearic acid | 2 | 2 | 2 | 2 | 2 | 2 | 2 |
| | Reinforcing material | Carbon black | 5 | 5 | 5 | 5 | 5 | 5 | 5 |
| | | Silica | — | — | — | — | — | — | — |
| | Antioxidant | NS-6 | — | — | — | — | — | — | — |
| | | NDIBC | 1.5 | 1.5 | 1.5 | 1.5 | 1.5 | 1.5 | 1.5 |
| | Foaming agent | Microballoons | — | — | — | — | — | — | — |
| Acrylonitrile-butadiene rubber | | Amount of acrylonitrile (mass %) | 33.0 | 33.0 | 33.0 | 33.0 | 33.0 | 33.0 | 33.0 |
| | | Amount of double bond (mmol/g) | 0.40 | 0.40 | 0.40 | 0.40 | 0.40 | 0.40 | 0.40 |
| | | Amount of monomer having carboxyl group (mass %) | 5.0 | 5.0 | 5.0 | 5.0 | 5.0 | 5.0 | 5.0 |

TABLE 2

| | | | Inner rubber composition No. | | | | | | | |
|---|---|---|---|---|---|---|---|---|---|---|
| | | | a | b | c | d | e | f | g | h |
| Formulation (parts by mass) | Base rubber | NR | 60 | — | — | — | — | — | — | — |
| | | EPDM | 40 | — | — | — | — | — | — | — |
| | | NBR | — | 100 | — | — | — | — | 100 | — |
| | | HNBR | — | — | 100 | — | — | — | — | 100 |
| | | XNBR | — | — | — | — | — | 100 | — | — |
| | | HXNBR | — | — | — | 100 | 100 | — | — | — |
| | Crosslinking agent | Sulfur | 1.5 | 1.5 | 1.5 | 1.5 | 1.5 | 1.5 | 1.5 | 1.5 |
| | Vulcanization accelerator | NS | 1.9 | — | — | — | — | — | — | — |
| | | TMTD | — | 3 | 3 | 3 | 3 | 3 | 3 | 3 |
| | Vulcanization activator | Zinc oxide | 5 | 5 | 5 | — | — | — | 5 | 5 |
| | | Zinc peroxide | — | — | — | 5 | 5 | 5 | — | — |
| | | Stearic acid | 1 | 2 | 2 | 2 | 2 | 2 | 2 | 2 |

TABLE 2-continued

|  | Reinforcing material | Carbon black | 2 | 5 | 5 | 5 | 5 | 5 | 5 | 5 |
|---|---|---|---|---|---|---|---|---|---|---|
|  |  | Silica | 10 | — | — | — | — | — | — | — |
|  | Antioxidant | NS-6 | 2.0 | — | — | — | — | — | — | — |
|  |  | NDIBC | — | 1.5 | 1.5 | — | — | 1.5 | 1.5 | 1.5 |
|  |  | TBTU | — | — | — | 1.0 | 1.0 | — | — | — |
|  | Foaming agent | Microballoons | 12 | 12 | 12 | 12 | 12 | 12 | 12 | 12 |
| Acrylonitrile-butadiene rubber |  | Amount of acrylonitrile (mass %) | — | 33.0 | 34.0 | 33.0 | 33.0 | 27.0 | 33.0 | 34.0 |
|  |  | Amount of double bond (mmol/g) | — | 12.4 | 0.49 | 0.40 | 0.40 | — | 12.4 | 0.49 |
|  |  | Amount of monomer having carboxyl group (mass %) | — | 0 | 0 | 5.0 | 5.0 | 7.5 | 0 | 0 |

|  |  |  | Inner rubber composition No. | | | | | | |
|---|---|---|---|---|---|---|---|---|---|
|  |  |  | i | j | k | l | m | n | o |
| Formulation (parts by mass) | Base rubber | NR | — | — | — | — | — | — | — |
|  |  | EPDM | — | — | — | — | — | — | — |
|  |  | NBR | — | — | — | — | — | — | — |
|  |  | HNBR | 100 | — | — | — | — | — | — |
|  |  | XNBR | — | 100 | — | — | — | — | — |
|  |  | HXNBR | — | — | 100 | 100 | 100 | 100 | 100 |
|  | Crosslinking agent | Sulfur | 1.5 | 1.5 | 1.5 | 1.5 | 1.5 | 1.5 | 1.5 |
|  | Vulcanization accelerator | NS | — | — | — | — | — | — | — |
|  |  | TMTD | 3 | 3 | 3 | 3 | 3 | 3 | 3 |
|  | Vulcanization activator | Zinc oxide | 5 | — | — | — | — | — | — |
|  |  | Zinc peroxide | — | 5 | 5 | 5 | 5 | 5 | 5 |
|  |  | Stearic acid | 2 | 2 | 2 | 2 | 2 | 2 | 2 |
|  | Reinforcing material | Carbon black | 5 | 5 | 5 | 5 | 5 | 5 | 5 |
|  |  | Silica | — | — | — | — | — | — | — |
|  | Antioxidant | NS-6 | — | — | — | — | — | — | — |
|  |  | NDIBC | 1.5 | 1.5 | — | — | — | — | — |
|  |  | TBTU | — | — | 1.0 | 1.0 | 1.0 | 1.0 | 1.0 |
|  | Foaming agent | Microballoons | 12 | 12 | 12 | 12 | 12 | 12 | 12 |
| Acrylonitrile-butadiene rubber |  | Amount of acrylonitrile (mass %) | 34.0 | 27.0 | 33.0 | 33.0 | 33.0 | 33.0 | 33.0 |
|  |  | Amount of double bond (mmol/g) | 0.49 | — | 0.40 | 0.40 | 0.40 | 0.40 | 0.40 |
|  |  | Amount of monomer having carboxyl group (mass %) | 0 | 7.5 | 5.0 | 5.0 | 5.0 | 5.0 | 5.0 |

|  |  |  | Inner rubber composition No. | | | | | | |
|---|---|---|---|---|---|---|---|---|---|
|  |  |  | p | q | r | s | t | u | v |
| Formulation (parts by mass) | Base rubber | NR | — | — | — | — | — | — | — |
|  |  | EPDM | — | — | — | — | — | — | — |
|  |  | NBR | — | — | — | — | — | — | — |
|  |  | HNBR | — | — | — | — | — | — | — |
|  |  | XNBR | — | — | — | — | — | — | — |
|  |  | HXNBR | 100 | 100 | 100 | 100 | 100 | 100 | 100 |
|  | Crosslinking agent | Sulfur | 1.5 | 1.5 | 1.5 | 1.5 | 1.5 | 1.5 | 1.5 |
|  | Vulcanization accelerator | NS | — | — | — | — | — | — | — |
|  |  | TMTD | 3 | 3 | 3 | 3 | 3 | 3 | 3 |
|  | Vulcanization activator | Zinc oxide | — | — | — | — | — | — | — |
|  |  | Zinc peroxide | 5 | 5 | 5 | 5 | 5 | 5 | 5 |
|  |  | Stearic acid | 2 | 2 | 2 | 2 | 2 | 2 | 2 |
|  | Reinforcing material | Carbon black | 5 | 5 | 5 | 5 | 5 | 5 | 5 |
|  |  | Silica | — | — | — | — | — | — | — |
|  | Antioxidant | NS-6 | — | — | — | — | — | — | — |
|  |  | NDIBC | — | — | — | — | — | — | — |
|  |  | TBTU | 1.0 | 1.0 | 1.0 | 1.0 | 1.0 | 1.0 | 1.0 |
|  | Foaming agent | Microballoons | 12 | 12 | 12 | 12 | 12 | 12 | 12 |
| Acrylonitrile-butadiene rubber |  | Amount of acrylonitrile (mass %) | 33.0 | 33.0 | 33.0 | 33.0 | 33.0 | 33.0 | 33.0 |
|  |  | Amount of double bond (mmol/g) | 0.40 | 0.40 | 0.40 | 0.40 | 0.40 | 0.40 | 0.40 |

TABLE 2-continued

|  |  |  |  |  |  |  |  |
|---|---|---|---|---|---|---|---|
| Amount of monomer having carboxyl group (mass %) | 5.0 | 5.0 | 5.0 | 5.0 | 5.0 | 5.0 | 5.0 |

Materials used in Tables 1 and 2 are shown below.
NR (natural rubber): TSR 20
EPDM (ethylene-propylene-diene rubber): ESPRENE (registered trademark) 505 A available from Sumitomo Chemical Co., Ltd.
NBR: acrylonitrile-butadiene rubber (Krynac (registered trademark) 3345F (amount of acrylonitrile: 33.0 mass %) available from Lanxess Corporation)
HNBR: hydrogenated acrylonitrile-butadiene rubber (Therban 3446 (amount of residual double bond: 4.0%, amount of acrylonitrile: 34.0 mass %) available from Lanxess Corporation)
XNBR: carboxyl-modified acrylonitrile-butadiene rubber (Krynac X750 (amount of acrylonitrile: 27.0 mass %, amount of monomer having carboxylic acid: 7.5 mass %) available from Lanxess Corporation)
HXNBR: hydrogenated carboxyl-modified acrylonitrile-butadiene rubber (Therban XT VPKA 8889 (amount of residual double bond: 3.5%, amount of acrylonitrile: 33.0 mass %, amount of monomer having carboxyl group: 5.0 mass %) available from Lanxess Corporation)
HARITACK SE10: hydrogenated rosin ester (an ester compound of rosin and polyhydric alcohol (including glycerin) in which the part derived from the rosin is hydrogenated, softening point: 78° C. to 87° C., acid value: 2 mgKOH/g to 10 mgKOH/g) available from Harima Chemicals Group, Inc.
HARITACK FK125: disproportionated rosin ester (an ester compound of rosin and polyhydric alcohol (including glycerin) in which the part derived from the rosin is disproportionated, softening point: 122° C. to 128° C., acid value: 14 mgKOH/g to 20 mgKOH/g) available from Harima Chemicals Group, Inc.
Ultrasen (registered trademark) 750: ethylene-vinyl acetate copolymer (amount of vinyl acetate: 32 mass %, softening point: 113° C.) available from Tosoh Corporation
Ultrasen 680: ethylene-vinyl acetate copolymer (amount of vinyl acetate: 20 mass %, softening point: 96° C.) available from Tosoh Corporation
Coumarone G90: Nittoresin (registered trademark) coumarone G90 (coumarone-indene resin, softening point: 90° C.) available from Nitto Chemical Co., Ltd.
NOVARES C10: liquid coumarone-indene resin (softening point: 5 to 15° C.) available from Rutgers Chemicals Corporation
Koresin (registered trademark): butylphenol-acetylene condensate (softening point: 135° C. to 150° C.) available from BASF Corporation
Nisseki polybutene HV-300: isobutene-n-butene copolymer (softening point: 0° C. or lower) available from JX Nippon Oil & Energy Corporation
Sulfur: 5% oil treated sulfur fine powder (200 mesh) available from Tsurumi Chemical Industry Co., Ltd.
NS: N-t-butyl-2-benzothiazolylsulfenamide (NOCCELER (registered trademark) NS) available from Ouchi Shinko Chemical Industry Co., Ltd.
TMTD: tetramethylthiuram disulfide (NOCCELER TT-P) available from Ouchi Shinko Chemical Industry Co., Ltd.
Zinc oxide: Ginrei R available from Toho Zinc Co., Ltd.
Zinc peroxide: available from Sigma-Aldrich Corporation
Stearic acid: beads stearic acid camellia available from NOF Co., Ltd.
Carbon black: SEAST SO (FEF) available from Tokai Carbon Co., Ltd.
Silica: ULTRASIL VN3 available from EVONIK Industries
NS-6: 2,2'-methylene bis(4-methyl-6-t-butylphenol) (NOCRAC (registered trademark) NS-6) available from Ouchi Shinko Chemical Industry Co., Ltd.
NDIBC: nickel dibutyldithiocarbamate (NOCRAC NBC) available from Ouchi Shinko Chemical Industry Co., Ltd.
TBTU: tributylthiourea (NOCRAC TBTU) available from Ouchi Shinko Chemical Industry Co., Ltd.
Microballoons: "Expancel 909-80" (resin capsules encapsulating a hydrocarbon having a low boiling point in a shell formed from a thermoplastic resin, volume average diameter: 18 μm to 24 μm, expansion starting temperature: 120° C. to 130° C.) available from Akzo Nobel Company The unvulcanized rubber sheet having a fan shape and the cap member were prepared by using the outer layer rubber composition. The outer layer rubber sheet was formed with a fixed thickness. The unvulcanized rubber sheet having a rectangular shape was prepared by using the inner layer rubber composition. The inner layer rubber sheet was formed with a thickness gradually becoming thicker from one end toward the other end. The inner layer rubber sheet was wound around a mandrel, and then the outer layer rubber sheet was laminated and wound around thereon. The mandrel having these rubber sheets being wound therearound, and the cap member were charged into a mold having a groove pattern on the cavity surface thereof. The heat treatment was performed at a mold temperature of 160° C. for 15 minutes to obtain golf club grips. In the obtained golf club grips, the cylindrical portion had a thickness of 1.5 mm at the thinnest part (the end part on the head side), and a thickness of 6.7 mm at the thickest part (the end part on the grip end side). Evaluation results for each of the grips are shown in Table 3.

TABLE 3

|  |  |  | Grip No. | | | | | | | |
|---|---|---|---|---|---|---|---|---|---|---|
|  |  |  | 1 | 2 | 3 | 4 | 5 | 6 | 7 | 8 |
| Outer layer | Rubber composition No. |  | A | B | C | D | E | F | G | H |
|  | Base rubber (parts by mass) | NR | 60 | — | — | — | — | — | — | — |
|  |  | EPDM | 40 | — | — | — | — | — | — | — |
|  |  | NBR | — | 100 | — | — | — | — | 100 | — |
|  |  | HNBR | — | — | 100 | — | — | — | — | 100 |
|  |  | XNBR | — | — | — | — | — | 100 | — | — |
|  |  | HXNBR | — | — | — | 100 | 100 | — | — | — |

TABLE 3-continued

|  |  |  |  |  |  |  |  |  |  |
|---|---|---|---|---|---|---|---|---|---|
|  | Resin (parts by mass) | HARITACK SE10 | — | — | — | — | — | — | 10 | 10 |
|  |  | HARITACK FK125 | — | — | — | — | — | — | — | — |
|  |  | Ultrasen 750 | — | — | — | — | — | — | — | — |
|  |  | Ultrasen 680 | — | — | — | — | — | — | — | — |
|  |  | Coumarone G-90 | — | — | — | — | — | — | — | — |
|  |  | NOVARES C10 | — | — | — | — | — | — | — | — |
|  |  | Koresin | — | — | — | — | — | — | — | — |
|  |  | Nisseki polybutene | — | — | — | — | — | — | — | — |
|  | Material hardness (Shore A) |  | 53 | 55 | 55 | 62 | 60 | 59 | 53 | 53 |
|  | Foaming ratio |  | — | — | — | — | 1.2 | — | — | — |
|  | Density (cm$^3$) |  | 1.0 | 1.0 | 1.0 | 1.0 | 0.8 | 1.0 | 1.0 | 1.0 |
|  | Thickness (mm) |  | 0.8 | 0.8 | 0.8 | 0.8 | 0.8 | 0.8 | 0.8 | 0.8 |
| Inner layer | Rubber composition No. |  | a | b | c | d | e | f | g | h |
|  | Base rubber |  | NR, EPDM | NBR | HNBR | HXNBR | HXNBR | XNBR | NBR | HNBR |
|  | Material hardness (Shore A) |  | 26 | 28 | 28 | 32 | 32 | 31 | 26 | 28 |
|  | Foaming ratio |  | 3.3 | 3.3 | 3.3 | 3.3 | 3.3 | 3.3 | 3.3 | 3.3 |
|  | Density (cm$^3$) |  | 0.3 | 0.3 | 0.3 | 0.3 | 0.3 | 0.3 | 0.3 | 0.3 |
|  | Mass (g) |  | 26 | 26 | 26 | 26 | 24 | 26 | 26 | 26 |
|  | Tensile strength |  | 249 | 100 | 710 | 784 | 256 | — | 78 | 644 |
|  | Grip performance under wet condition |  | 119 | 100 | 91 | 93 | 96 | 98 | 132 | 122 |
|  | Abrasion resistance |  | 57 | 100 | — | 425 | 311 | 954 | 81 | — |
|  | Sustainability of grip performance under wet condition |  | G | G | G | G | G | G | G | G |

|  |  |  | Grip No. | | | | | | |
|---|---|---|---|---|---|---|---|---|---|
|  |  |  | 9 | 10 | 11 | 12 | 13 | 14 | 15 |
| Outer layer | Rubber composition No. |  | I | J | K | L | M | N | O |
|  | Base rubber (parts by mass) | NR | — | — | — | — | — | — | — |
|  |  | EPDM | — | — | — | — | — | — | — |
|  |  | NBR | — | — | — | — | — | — | — |
|  |  | HNBR | 100 | — | — | — | — | — | — |
|  |  | XNBR | — | 100 | — | — | — | — | — |
|  |  | HXNBR | — | — | 100 | 100 | 100 | 100 | 100 |
|  | Resin (parts by mass) | HARITACK SE10 | 20 | 10 | 10 | 20 | 10 | — | — |
|  |  | HARITACK FK125 | — | — | — | — | — | — | — |
|  |  | Ultrasen 750 | — | — | — | — | — | 10 | 20 |
|  |  | Ultrasen 680 | — | — | — | — | — | — | — |
|  |  | Coumarone G-90 | — | — | — | — | — | — | — |
|  |  | NOVARES C10 | — | — | — | — | — | — | — |
|  |  | Koresin | — | — | — | — | — | — | — |
|  |  | Nisseki polybutene | — | — | — | — | — | — | — |
|  | Material hardness (Shore A) |  | 51 | 57 | 58 | 56 | 57 | 58 | 56 |
|  | Foaming ratio |  | — | — | — | — | 1.2 | — | — |
|  | Density (cm$^3$) |  | 1.0 | 1.0 | 1.0 | 1.0 | 0.8 | 1.0 | 1.0 |
|  | Thickness (mm) |  | 0.8 | 0.8 | 0.8 | 0.8 | 0.8 | 0.8 | 0.8 |
| Inner layer | Rubber composition No. |  | i | j | k | l | m | n | o |
|  | Base rubber |  | HNBR | XNBR | HXNBR | HXNBR | HXNBR | HXNBR | HXNBR |
|  | Material hardness (Shore A) |  | 28 | 30 | 32 | 32 | 32 | 32 | 32 |
|  | Foaming ratio |  | 3.3 | 3.3 | 3.3 | 3.3 | 3.3 | 3.3 | 3.3 |
|  | Density (cm$^3$) |  | 0.3 | 0.3 | 0.3 | 0.3 | 0.3 | 0.3 | 0.3 |
|  | Mass (g) |  | 26 | 26 | 26 | 26 | 24 | 26 | 26 |
|  | Tensile strength |  | 572 | — | 678 | 601 | 218 | 688 | 618 |
|  | Grip performance under wet condition |  | 128 | 125 | 119 | 130 | 136 | 110 | 118 |
|  | Abrasion resistance |  | — | 744 | 335 | 259 | 227 | 345 | 272 |
|  | Sustainability of grip performance under wet condition |  | G | G | G | G | G | G | G |

TABLE 3-continued

| | | | Grip No. | | | | | | |
|---|---|---|---|---|---|---|---|---|---|
| | | | 16 | 17 | 18 | 19 | 20 | 21 | 22 |
| Outer layer | Rubber composition No. | | P | Q | R | S | T | U | V |
| | Base rubber (parts by mass) | NR | — | — | — | — | — | — | — |
| | | EPDM | — | — | — | — | — | — | — |
| | | NBR | — | — | — | — | — | — | — |
| | | HNBR | — | — | — | — | — | — | — |
| | | XNBR | — | — | — | — | — | — | — |
| | | HXNBR | 100 | 100 | 100 | 100 | 100 | 100 | 100 |
| | Resin (parts by mass) | HARITACK SE10 | — | — | — | — | — | — | — |
| | | HARITACK FK125 | — | — | — | — | — | — | 10 |
| | | Ultrasen 750 | — | — | — | — | — | — | — |
| | | Ultrasen 680 | 10 | — | — | — | — | — | — |
| | | Coumarone G-90 | — | 10 | — | — | — | — | — |
| | | NOVARES C10 | — | — | 10 | — | — | — | — |
| | | Koresin | — | — | — | 5 | 10 | — | — |
| | | Nisseki polybutene | — | — | — | — | — | 10 | — |
| | Material hardness (Shore A) | | 59 | 59 | 58 | 63 | 64 | 55 | 57 |
| | Foaming ratio | | — | — | — | — | — | — | — |
| | Density (cm³) | | 1.0 | 1.0 | 1.0 | 1.0 | 1.0 | 1.0 | 1.0 |
| | Thickness (mm) | | 0.8 | 0.8 | 0.8 | 0.8 | 0.8 | 0.8 | 0.8 |
| Inner layer | Rubber composition No. | | p | q | r | s | t | u | v |
| | Base rubber | | HXNBR | HXNBR | HXNBR | HXNBR | HXNBR | HXNBR | HXNBR |
| | Material hardness (Shore A) | | 32 | 32 | 32 | 32 | 32 | 32 | 32 |
| | Foaming ratio | | 3.3 | 3.3 | 3.3 | 3.3 | 3.3 | 3.3 | 3.3 |
| | Density (cm³) | | 0.3 | 0.3 | 0.3 | 0.3 | 0.3 | 0.3 | 0.3 |
| | Mass (g) | | 26 | 26 | 26 | 26 | 26 | 26 | 26 |
| | Tensile strength | | 698 | 708 | 612 | 722 | 705 | 544 | 588 |
| | Grip performance under wet condition | | 108 | 113 | 117 | 92 | 88 | 96 | 105 |
| | Abrasion resistance | | 360 | 298 | 248 | 361 | 372 | 210 | 215 |
| | Sustainability of grip performance under wet condition under wet condition | | G | G | G | P | P | P | P |

The grips No. 7 to 18 are the cases where the outer layer (outermost surface layer) thereof is formed from a rubber composition containing (A) a NBR based rubber and (B) a resin having a softening point in a range from 5° C. to 120° C. These grips No. 7 to 18 are excellent in the grip performance under a wet condition, and excellent in the sustainability of grip performance as well. In addition, regarding the grips No. 17 and 18, an odor which is thought to originate from the coumarone-indene resin is remained on the glove of the experimenter after the evaluation test of the grip performance.

The grip No. 1 is a reference example in which NR and EPDM are used as the base rubber. The grip No. 1 is inferior in the abrasion resistance. The grips No. 2 to 6 are the cases where the outer layer (outermost surface layer) thereof is formed from a rubber composition containing (A) a NBR based rubber but not containing (B) a resin having a softening point in a range from 5° C. to 120° C. These grips No. 2 to 6 are inferior in the grip performance under a wet condition. The grips No. 19 to 22 are the cases where the outer layer (outermost surface layer) thereof is formed from a rubber composition containing (A) a NBR based rubber and a tackifier having a softening point of less than 5° C. or higher than 120° C. These grips No. 19 to 22 are inferior in the sustainability of grip performance.

This application is based on Japanese patent application No. 2015-253776 filed on Dec. 25, 2015, the contents of which are hereby incorporated by reference.

The invention claimed is:

1. A grip for sporting goods comprising an outermost surface layer formed from a surface layer rubber composition and an inner layer,
   wherein the surface layer rubber composition contains (A) a base rubber and (B) a resin having a softening point in a range from 5° C. to 120° C.,
   (A) the base rubber contains an acrylonitrile-butadiene based rubber,
   the acrylonitrile-butadiene based rubber is at least one type selected from the group consisting of a carboxyl-modified acrylonitrile-butadiene rubber, a hydrogenated acrylonitrile-butadiene rubber and a carboxyl-modified hydrogenated acrylonitrile-butadiene rubber,
   (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin, and
   the inner layer is formed from a rubber composition containing an acrylonitrile-butadiene based rubber as a base rubber.

2. A golf club comprising a shaft, a head provided on one end of the shaft, and a grip provided on another end of the shaft, wherein the grip comprises an outermost surface layer formed from a surface layer rubber composition and an inner layer,
   the surface layer rubber composition contains (A) a base rubber and (B) a resin having a softening point in a range from 5° C. to 120° C.,
   (A) the base rubber contains an acrylonitrile-butadiene based rubber,
   the acrylonitrile-butadiene based rubber is at least one type selected from the group consisting of a carboxyl-modified acrylonitrile-butadiene rubber, a hydrogenated acrylonitrile-butadiene rubber and a carboxyl-modified hydrogenated acrylonitrile-butadiene rubber, (B) the resin is at least one type selected from the group consisting of a hydrogenated rosin ester, a disproportionated rosin ester, an ethylene-vinyl acetate copolymer, a coumarone resin, a phenol resin, a xylene resin and a styrene resin, and the inner layer is formed from a rubber composition containing an acrylonitrile-butadiene based rubber as a base rubber.

3. The grip for sporting goods according to claim 1, wherein an amount of (B) the resin is 2 parts by mass or more and 40 parts by mass or less with respect to 100 parts by mass of (A) the base rubber.

4. The grip for sporting goods according to claim 3, wherein an amount of the acrylonitrile-butadiene based rubber in (A) the base rubber is 50 mass % or more.

5. The grip for sporting goods according to claim 4, the acrylonitrile-butadiene based rubber is at least one type selected from the group consisting of a carboxyl-modified acrylonitrile-butadiene rubber and a carboxyl-modified hydrogenated acrylonitrile-butadiene rubber.

6. The grip for sporting goods according to claim 5, the acrylonitrile-butadiene based rubber is a carboxyl-modified hydrogenated acrylonitrile-butadiene rubber.

7. The grip for sporting goods according to claim 6, wherein (B) the resin is at least one type selected from the group consisting of the hydrogenated rosin ester, the disproportionated rosin ester, the ethylene-vinyl acetate copolymer and the coumarone resin.

8. The grip for sporting goods according to claim 7, wherein (B) the resin is at least one type selected from the group consisting of the hydrogenated rosin ester and the ethylene-vinyl acetate copolymer.

9. The grip for sporting goods according to claim 8, wherein (B) the resin is the hydrogenated rosin ester, and an acid value of the hydrogenated rosin ester is 2 mgKOH/g or more and 200 mgKOH/g or less.

10. The grip for sporting goods according to claim 8, wherein (B) the resin is the ethylene-vinyl acetate copolymer, and an amount of vinyl acetate in the ethylene-vinyl acetate copolymer is 10 mass % or more and 80 mass % or less.

11. The grip for sporting goods according to claim 8, wherein a material hardness (Shore A hardness) of the surface layer rubber composition is 30 or more and 80 or less.

12. The grip for sporting goods according to claim 11, wherein the grip for sporting goods comprises a cylindrical portion composed of a cylindrical inner layer and a cylindrical outer layer covering the cylindrical inner layer, the cylindrical outer layer is formed from the surface layer rubber composition, and a density ($D_{in}$) of the cylindrical inner layer is lower than a density ($D_{out}$) of the cylindrical outer layer.

13. The grip for sporting goods according to claim 12, wherein the density ($D_{in}$) of the cylindrical inner layer ranges from 0.20 g/cm$^3$ to 0.50 g/cm$^3$.

14. The golf club according to claim 2, wherein an amount of (B) the resin is 2 parts by mass or more and 40 parts by mass or less with respect to 100 parts by mass of (A) the base rubber.

15. The golf club according to claim 14, wherein an amount of the acrylonitrile-butadiene based rubber in (A) the base rubber is 50 mass % or more.

16. The golf club according to claim 15, the acrylonitrile-butadiene based rubber is at least one type selected from the group consisting of a carboxyl-modified acrylonitrile-butadiene rubber and a carboxyl-modified hydrogenated acrylonitrile-butadiene rubber.

17. The golf club according to claim 16, the acrylonitrile-butadiene based rubber is a carboxyl-modified hydrogenated acrylonitrile-butadiene rubber.

18. The golf club according to claim 17, wherein (B) the resin is at least one type selected from the group consisting of the hydrogenated rosin ester, the disproportionated rosin ester, the ethylene-vinyl acetate copolymer and the coumarone resin.

19. The golf club according to claim 18, wherein (B) the resin is at least one type selected from the group consisting of the hydrogenated rosin ester and the ethylene-vinyl acetate copolymer.

20. The golf club according to claim 19, wherein (B) the resin is the hydrogenated rosin ester, and an acid value of the hydrogenated rosin ester is 2 mgKOH/g or more and 200 mgKOH/g or less.

21. The golf club according to claim 19, wherein (B) the resin is the ethylene-vinyl acetate copolymer, and an amount of vinyl acetate in the ethylene-vinyl acetate copolymer is 10 mass % or more and 80 mass % or less.

22. The golf club according to claim 19, wherein a material hardness (Shore A hardness) of the surface layer rubber composition is 30 or more and 80 or less.

23. The golf club according to claim 22, wherein the grip comprises a cylindrical portion composed of a cylindrical inner layer and a cylindrical outer layer covering the cylindrical inner layer, the cylindrical outer layer is formed from the surface layer rubber composition, and a density ($D_{in}$) of the cylindrical inner layer is lower than a density ($D_{out}$) of the cylindrical outer layer.

24. The golf club according to claim 23, wherein the density ($D_{in}$) of the cylindrical inner layer ranges from 0.20 g/cm$^3$ to 0.50 g/cm$^3$.

* * * * *